United States Patent Office 3,477,098
Patented Nov. 11, 1969

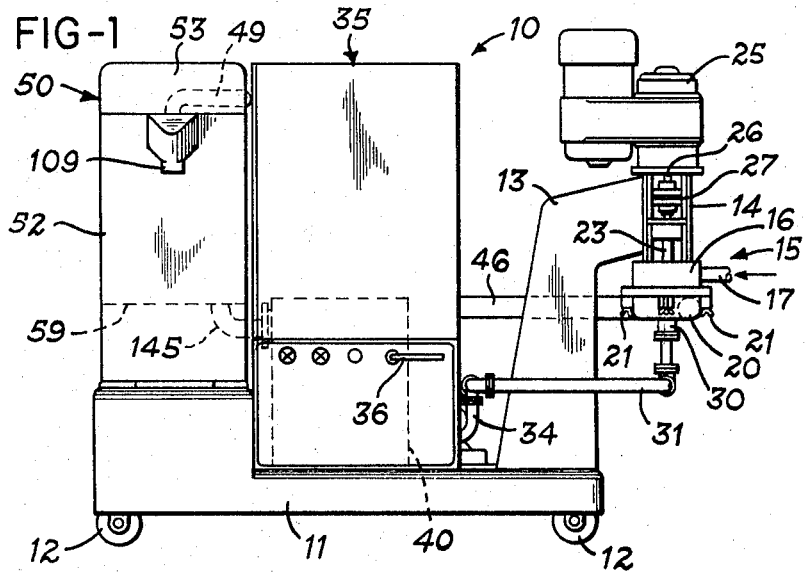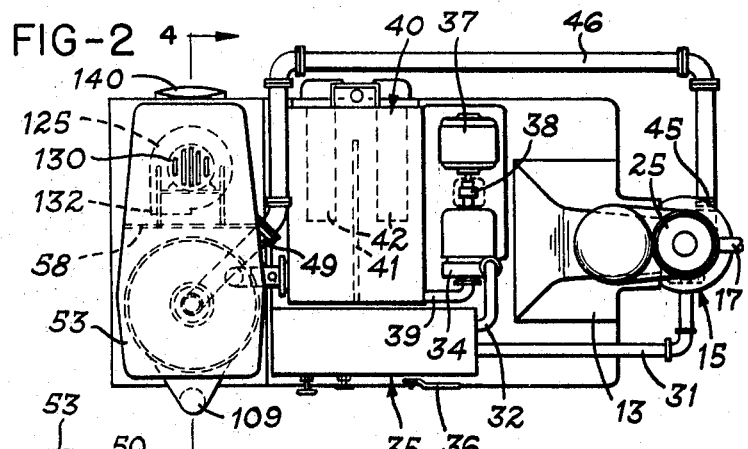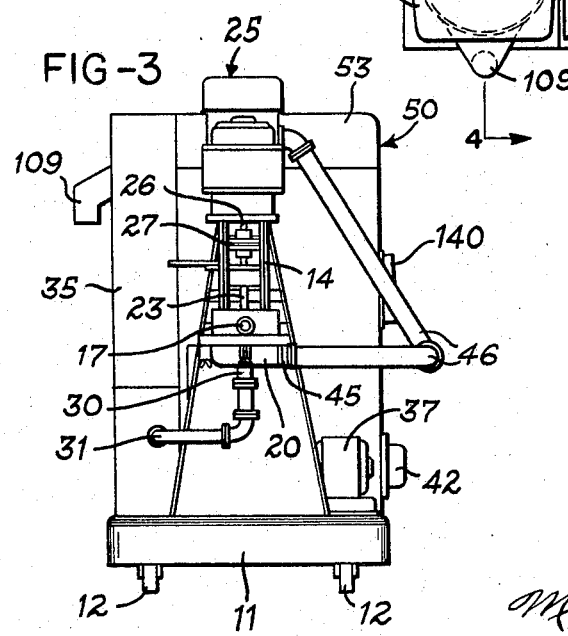

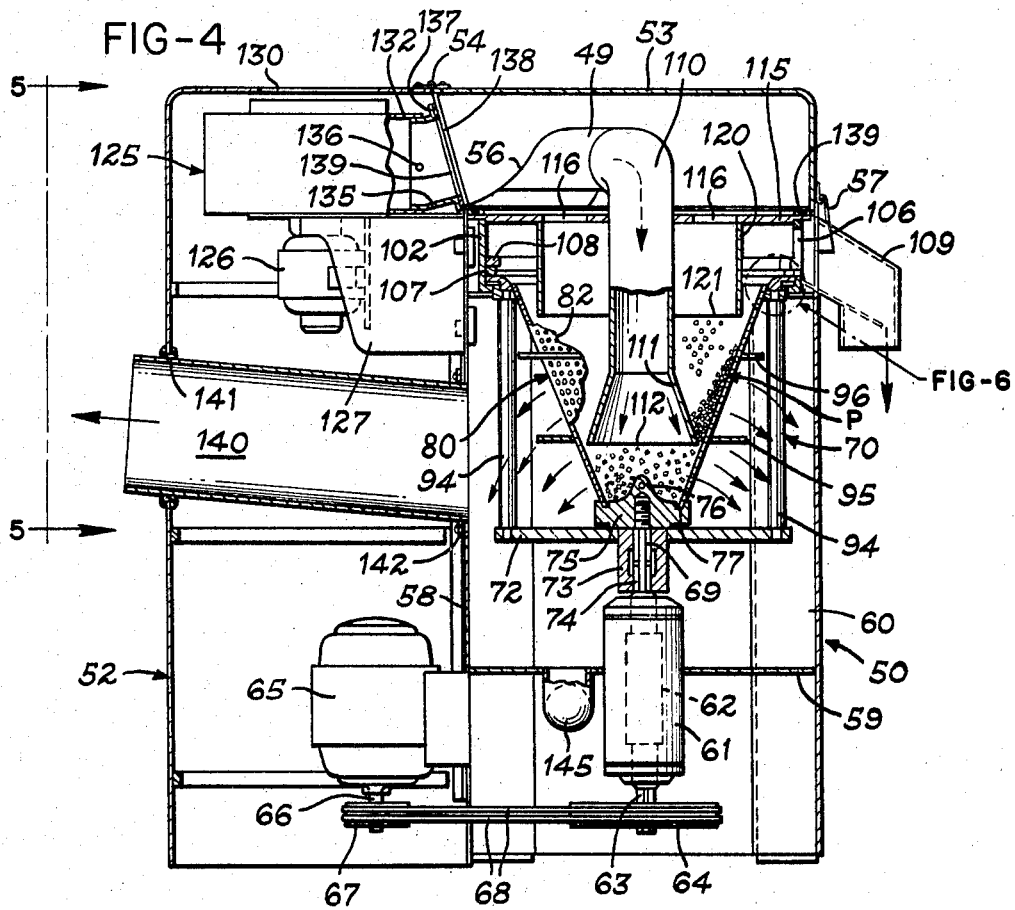
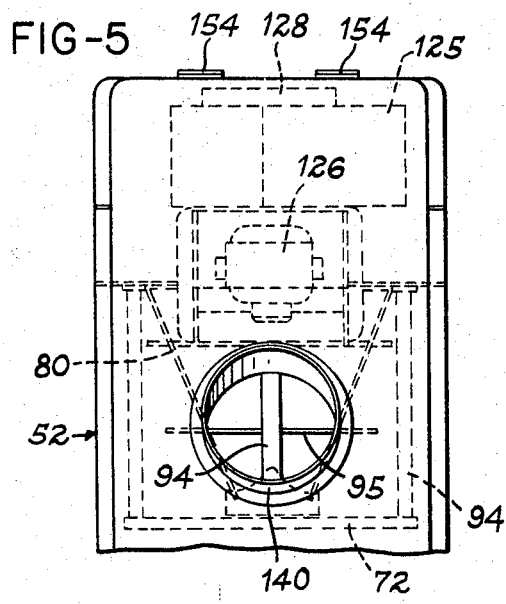
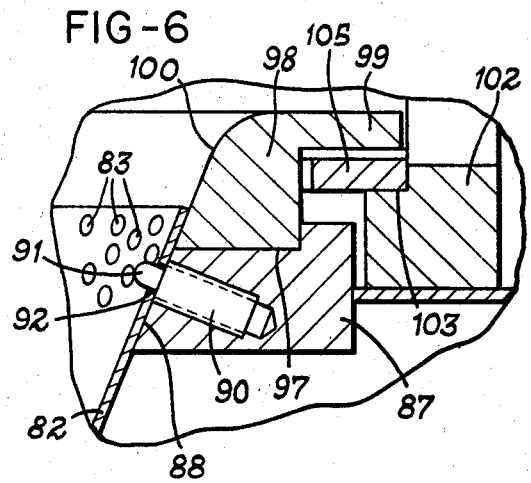

3,477,098
APPARATUS FOR PRODUCING DRY
PLASTIC PELLETS
James L. Swickard, Toledo, and Paul H. Koppehele, Fairfield, Ohio, assignors to The Black Clawson Company, Hamilton, Ohio, a corporation of Ohio
Filed June 20, 1967, Ser. No. 647,454
Int. Cl. B29f 3/08; B04b 3/00
U.S. Cl. 18—12                                          7 Claims

ABSTRACT OF THE DISCLOSURE

A portable self-contained plastic pellet forming, cooling and drying unit including a pelletizer for converting molten plastic into pellets and having a water supply system for cooling the pellets and conveying them in the form of slurry to a drier. A pellet drier is disclosed which centrifugally separates the water from the pellets, directs an air flow over the pellets and returns the water to the tank for recirculation.

BACKGROUND OF THE INVENTION

In the production of thermoplastic film or other products with a plastic extruder, a certain amount of scrap material is formed either during startup of the extruder or due to a change in operating conditions, and it is desirable to reclaim this material. In some plants where there are several extruders in operation, there is usually sufficient scrap material produced to justify another extruder solely for handling the scrap. Generally this extruder is permanently connected to a pelletizer such as disclosed in Patents Nos. 3,230,582 and 3,287,764, both of which are assigned to the assignee of the present invention. The scrap material is fed into the extruder either directly or after a grinding operation and is thereby converted back into pellets which are dried and subsequently mixed with virgin pellets for reuse.

In smaller plants, as for example, plants having one to three extruders, the scrap produced is not sufficient to justify an additional extruder which is permanently connected to a pelletizer solely for reclaiming scrap. In these plants, one of the extruders is periodically shut down and the die is replaced by a pelletizer. The scrap plastic material which has been collected is then fed into the extruder and converted into pellets. The pelletizer may be of the underwater type such as disclosed in the above patents so that the pellets are immediately cooled by water as they are formed by a knife rotating adjacent a die plate.

The pellets are commonly dried by directing the slurry of water and pellets from the pelletizer to a drier consisting of a stationary cylindrical perforated screen supported with its axis extending vertically and including a rotor having a plurality of inclined paddles which are spaced adjacent the inner surface of the screen. The slurry is fed into the bottom of the screen and the pellets are conveyed upwardly by the rotation of the paddles. The water drains from the pellets and flows outwardly through the perforations within the screen and air is blown over the pellets to dry them.

The installation of such a drier along with all of the necessary water lines and controls results in a substantial investment in equipment solely for reclaiming scrap material. Furthermore, the drier frequency cracks the pelelts as a result of rough action between the rotating paddles and the stationary screen.

SUMMARY OF THE INVENTION

The present invention is directed to an improved compact unit which is adapted to be easily connected to a plastic extruder for efficiently converted the discharged material into cool dry pellets. While the compact unit may be assembled as a portable unit for serving two or more extruders, the unit is also suited for permanent installation with one extruder with the advantage that the installation cost is substantially reduced.

In accordance with a preferred form of the invention, the unit incorporates an underwater pelletizer such as shown in the above mentioned Patent No. 3,287,764, an improved centrifugal drier, and a water supply and pumping system for recirculating water between the pelletizer and the drier. These components are mounted in a compact arrangement on a base which may be provided with casters for conveniently moving the unit from storage to the extruder.

The drier of the invention incorporates a frusto-conical perforated basket rotated on a vertical axis and disposed so that the slurry of water and pellets from the pelletizer is fed into the smaller lower end portion of the basket while air is moved through the larger diameter upper end portion of the basket. The rotation of the basket causes the bulk of the water to be thrown outwardly through the perforations within the lower portion of the basket while the pellets flow gently upwardly along the inner surface of the basket where the air flow drys the pellets. The dry pellets are centrifugally discharged through a chute extending from the upper end of the basket.

Additional advantages and features of the unit will be apparent from the following description, the accompanying drawings and the appended claims.

BRIEF DESCRIPTION OF THE DRAWINGS

FIG. 1 is a side elevational view of a unit constructed in accordance with the invention;

FIG. 2 is a top view of the unit shown in FIG. 1;

FIG. 3 is a front end view of the unit shown in FIGS. 1 and 2;

FIG. 4 is a vertical section of the drier taken generally along the line 4—4 of FIG. 2;

FIG. 5 is a fragmentary elevational view of the drier looking generally along the line 5—5 of FIG. 4; and FIG. 6 is an enlarged fragmentary section of the portion generally enclosed within the dotted circle shown in FIG. 4.

DESCRIPTION OF THE PREFERRED EMBODIMENT

Referring to FIGS. 1–3, a pellet forming and drying unit 10 constructed in accordance with the invention, includes a base 11 which may be supported by casters 12 and having an upwardly extending pedestal 13 on which is mounted a frame 14. A pelletizer 15 is mounted on the lower end of the frame 14 and is preferably constructed as shown in the above mentioned Patent No. 3,230,582. That is, the pelletizer 15 includes a body 16 having an inlet to which is connected a conduit 17 adapted to receive a molten polymer discharged from an extruder. A pellet collecting housing 20 is removably secured to the body 16 by wing nuts 21 and encloses a rotary knife assembly (not shown) which is mounted on the lower end portion of a shaft 23 and is positioned adjacent a die plate (not shown) mounted on the body 16.

The shaft 23 is driven by a variable speed drive 25 mounted on the upper end of the frame 14 and having an output shaft 26 connected to the shaft 23 by a coupling 27, however, direct drive may be used. The housing 20 is provided with a water inlet 30 which is connected by lines 31 and 32 to the outlet of a centrifugal pump 34 through a bypass valve (not shown) enclosed within a control console 35 and operated by a lever 36. The pump 34 is mounted on the base 11 and is driven by a motor 37 through a coupling 38.

The inlet of the pump is connected by a line 39 to a water supply tank 40 also mounted on the base 11 and having an internal partition 41 extending partially between a pair of electrical heating elements 42 which are operated by suitable controls mounted on the control console 35. The pelletizer housing 20 also includes an outlet 45 which is connected by a line 46. The line 46 connects with an inlet duct 49 which extends into a drier 50.

Referring to FIG. 4, the drier 50 includes a housing 52 to which a hood 53 is connected by hinges 54. The hood 53 is formed with a slot 56 for receiving the inlet duct 49, and a toggle catch 57 releasably secures the hood to the housing 52 so that the hood may be pivoted upwardly. The housing 52 includes inner walls 58 and 59 which cooperate with three of the outer walls to define a chamber 60. The wall 59 and a frame member (not shown) support a bearing housing 61 which, in turn, rotatably supports a vertically extending spindle 62 having a lower end portion 63 supporting a drive pulley 64. The spindle 62 is driven by a motor 65 mounted on the wall 58 and having an output shaft 66 supporting a pulley 67 connected to the pulley 64 by a pair of V-belts 68.

The spindle 62 has an upper end portion 69 which supports a rotor 70 including a circular bottom plate 72 rigidly secured to the hub 73 mounted on the spindle portion 69 and secured for rotation by a key 74. A nut member 75 is threadably connected to the upper end portion 69 of the spindle 62 and serves to lock the bottom plate 72 and hub 73 to the spindle. The central portion of the nut member 75 is formed with a smooth conical surface 76 and the outer portion of the nut member is formed with an annular groove 77.

An inverted frusto-conical shaped basket 80 has a lower end portion which is removably received within the groove 77 and includes a sheet metal wall 82 having perforations 83. As shown in FIG. 4, the included angle at the base of the basket 80 is on the order of 45°. The larger upper end of the basket 80 is confined within a ring 87 (FIG. 6) having an inner tapered surface 88 conforming to the conical shape of the basket 80. A series of retaining devices 90 (FIG. 6) are mounted within the ring 87 in uniform angularly spaced relation and include spring loaded plungers 91 which project into corresponding openings 92 formed within the basket 80. The basket is thus removable for cleaning by depressing the plungers 91 and lifting.

The ring 87 is rigidly connected to the bottom plate 72 by a series of four uniformly spaced tie rods 94 extending parallel to the vertical axis of rotation of the rotor 70. Flat annular slingers 95 and 96 (FIG. 4) are mounted on the outer surface of the wall 82 in axial spaced relation to interrupt the tendency for water to creep up the outside of the basket. An annular groove 97 is formed within the top surface of the ring 87 and receives a discharge ring 98 having a radially extending flange 99 and a smooth curved surface 100.

A cylindrical casing 102 (FIGS. 4 and 6) surrounds the ring 98 and is rigidly secured to the housing 52. An inner shoulder 103 is formed on the lower portion of the casing 102 and supports a flat seal ring 105 which cooperates with the flange 99 and the ring 87 to form a labyrinth type seal. A discharge opening 106 is formed within the casing 102 and aligned gaps or openings are formed within a stationary packing seal 107 engaging the flange 99 and a retaining ring 108 for the seal. A discharge chute 109 is mounted on the housing 52 and projecting outwardly from the opening 106.

As shown in FIG. 4, the inlet duct 49 supports a downwardly extending duct 110 having a frusto-conical lower end portion 111 of which the bottom periphery 112 is spaced close to the inner surface of the lower end portion of the basket 80. The duct 110 is removably connected to the inlet duct 49 so that the duct 110 may be removed from within the basket 80.

A plate 115 is mounted on the upper surface of the cylindrical casing 102 and includes a series of annularly arranged openings 116. A cylindrical duct 120 is mounted on the underneath surface of the plate 115 and extends downwardly concentric with the duct 110 and has a lower periphery 121 which is spaced close to the upper end portion of the basket 80.

A blower 125 is mounted within the upper portion of the housing 52 and includes an impeller (not shown) which is driven by a motor 126 mounted on a bracket 127 connected to the wall 58. An axial inlet opening is formed within the upper portion of the blower 125 and receives air openings 130 (FIGS. 2 and 4) formed within the top wall of the housing 52. The blower includes a discharge outlet 132 in which a duct 135 is supported by sheet metal screws 136. The duct includes an outwardly extending and downwardly sloping flange 137 which seats against a corresponding flange 138 formed on the hood 53 so that a positive seal is formed between the hood and the duct 135 when the hood is closed against a resilient seal 139 mounted on the top surface of the plate 115.

A cylindrical air discharge duct 140 extends through an opening 141 formed within the housing 52 and has an inner end portion which is secured by a flange 142 to the inner wall 58 of the housing 52. A return line 145 (FIGS. 1 and 4) connects the bottom wall 59 to the water storage tank 40.

In operation, clean water is supplied to the tank in any suitable manner, such as by a float-operated valve, not shown. This water supply is controlled by a water inlet valve mounted within the console 35 which also includes a control valve for draining the tank 40. Since the fresh water is usually too cold for supplying to the pelletizer 15, the heaters 42 are energized until the water is heated to a predetermined temperature. While the water is being heated and the pelletizer is being heated, such as by resistance heaters (not shown), the bypass valve is actuated by the lever 36 so that the water is circulated by the pump 34 through the lines 32 and a bypass line (not shown) to the tank 40.

When the water temperature has been brought up to the desired temperature for optimum pelletizing of the particular polymer, the bypass valve 36 is actuated to direct the water through the line 31 to the pelletizer water housing 20. As the polymer is extruded into the housing 20 and sheared into pellets by the knife rotated by the drive 25, the pellets are carried by the water through the line 46 in the form of a slurry. This slurry is directed downwardly through the duct 110 and into the lower portion of the rotating basket 80 which causes the water to be thrown outwardly through the perforations 83 for collection within the chamber 60 and returned to the tank 40 by the line 145.

As illustrated in FIG. 4, the rotation of the basket produces a layer of pellets P on the inner surface of the basket 80. The pellets move upwardly along the inner surface of the basket 80 and are thrown outwardly through the openings formed within the packing ring 107, retaining ring 108, and casing 105 and into the chute 109 for discharge into a suitable container. As the pellets move upwardly within the basket 80, moisture laden air is removed by a flow of air from the blower 125 directed through the duct 120. Air is moved through the perforations 83 within the upper portion of the basket and is discharged through the duct 140. It is within the scope of the invention to pull the air through the drier by placing the blower 125 in the discharge conduit 140.

From the drawings and the above description, it can be seen that a pellet forming and drying unit constructed in accordance with the invention provides desirable features and advantages. For example, by assembling the centrifugal drier 50, the pelletizer 15, water supply tank 40, motor driven pump 34 and the water lines and controls for these components on the base 11, a compact unit is formed for converting extruded plastic material directly into dry pellets. As mentioned above, this unit may be quickly installed in permanent connection with a plastic mixer or extruder with substantially lower installation cost than heretofore required. In addition, the unitized system can be supported by casters and thereby provide a portable unit which can be moved about to service two or more plastic mixers or extruders.

Important advantages are provided by the construction of the drier 50. For example, the slurry of water and pellets are fed into the lower end portion of the rotating conical shaped basket 80 where the bulk of water is separated from the pellets at the lower end portion of the basket and the increasing centrifugal force dries the pellets as they progress upwardly towards the larger end portion of the basket for discharge through the chute 109. Furthermore, the conical configuration of the basket 80 with the smooth inner surface provides a gentle rolling action of the pellets upwardly within the basket 80. As a result, the pellets are discharged without abrasion and cracks. The close fit between the lower periphery 112 of the duct 110 and the inner surface of the basket 80 is also effective to prevent water splash within the basket and thereby avoid disrupting the smooth upward flow of pellets.

Another important feature is provided by hinging the hood 53 and providing for removing of the duct 110 and plate 115 along with the air duct 120. As a result, the basket 80 can be conveniently removed by depressing the retaining plungers 91 so that the basket can be periodically cleaned to assure that none of its openings 83 are blocked.

While the process and apparatus herein described constitute preferred embodiments of the invention, it is to be understood that the invention is not limited to this process and apparatus, and that changes may be made therein without departing from the scope of the invention which is defined in the appended claims.

What is claimed is:
1. A self-contained unit for converting molten plastic material into dry pellets, comprising means defining a base, a motor driven pelletizer on said base having a material inlet adapted to be connected to an extruder and operable for converting the discharged material into pellets, a water supply tank on said base, a pellet drier on said base including a frusto-conical basket having means defining perforations therein, means supporting said basket for rotation in a substantially vertical axis with the larger end portion of said basket facing upwardly, conduit means for connecting said tank to said pelletizer and said pelletizer to said drier, pump means in said conduit means for producing a flow of water from said tank to said pelletizer for cooling the pellets and for producing a flow of water and pellets in the form of a slurry from said pelletizer into said basket, drive means for rotating said basket to effect a centrifugal separation of water from the pellets outwardly through said perforations and to convey the pellets upwardly within said basket to said open top, means for collecting the dry pellets discharged from said basket, means for collecting the water separated from the pellets, and conduit means connecting said water collecting means to said tank for returning water to said tank for recirculation by said pump means.

2. The apparatus of claim 1 further comprising blower means on said dryer for directing a flow of air into said basket to enhance the drying of pellets therein.

3. Apparatus as defined in claim 1 including a plurality of wheels mounted on said base to provide for conveniently moving said unit for servicing two or more extruders or mixers.

4. Apparatus as defined in claim 1 including heater means within said tank, means associated with said conduit means and said pump means for circulating water between said tank and said drier while bypassing said pelletizer to provide for heating the water to a predetermined temperature prior to pelletizing.

5. Self-contained apparatus for converting an extruded polymer into dried pellets of such polymer, comprising a base, a pelletizer mounted on said base and adapted to be connected to the discharge end of an extruder for forming pellets of such polymer extruded from such extruder into said pelletizer, a water tank on said base, means connecting said pelletizer to receive water from said tank for entraining pellets cut by said pelletizer forming a slurry of water and pellets, conduit means connected to said pelletizer to convey said slurry from said pelletizer, a pellet drier on said base connected to receive said slurry from said conduit means and operable to separate said pellets and said water, and water return conduit means connected to said drier to erturn water removed from said pellets to said tank.

6. The apparatus of claim 5 further comprising blower means associated with said drier for moving a quantity of air over said pellets during a separation thereof from said water for facilitating the drying of said pellets.

7. The apparatus of claim 5 further comprising roller means mounted on said base for facilitating the movement of said apparatus into position with respect to such extruder.

References Cited

UNITED STATES PATENTS

| | | | |
|---|---|---|---|
| 650,402 | 5/1900 | Laplace | 210—380 |
| 1,832,269 | 11/1931 | Webb | 210—369 |
| 3,050,190 | 8/1962 | Siepe | 210—380 |
| 3,207,627 | 9/1965 | Dietzel et al. | 210—178 X |
| 3,225,384 | 12/1965 | Oswald et al. | |
| 3,230,582 | 1/1966 | Hoffman et al. | |
| 3,268,078 | 9/1966 | Muggli | 210—376 X |
| 3,316,590 | 5/1967 | Rettig. | |
| 3,341,892 | 9/1967 | Mayner. | |

WILLIAM J. STEPHENSON, Primary Examiner.

U.S. Cl. X.R.

210—78